(12) United States Patent
Lesage

(10) Patent No.: US 9,395,101 B2
(45) Date of Patent: Jul. 19, 2016

(54) PRESSURE CLAMP ADAPTER FOR MOUNTING A THERMISTOR ON A THERMOSTAT CONTROL BRACKET

(71) Applicant: MICLAU-S.R.I. INC., Montreal-East (CA)

(72) Inventor: Claude Lesage, Pointe-Claire (CA)

(73) Assignee: MICLAU-S.R.I. INC

( * ) Notice: Subject to any disclaimer, the term of this patent is extended or adjusted under 35 U.S.C. 154(b) by 0 days.

(21) Appl. No.: 14/120,630

(22) Filed: Jun. 11, 2014

(65) Prior Publication Data

US 2015/0362215 A1 Dec. 17, 2015

(51) Int. Cl.

| | |
|---|---|
| H01H 37/04 | (2006.01) |
| F24H 9/20 | (2006.01) |
| F16B 2/24 | (2006.01) |
| H01H 39/00 | (2006.01) |
| A47B 96/06 | (2006.01) |
| A47G 29/18 | (2006.01) |
| A47G 29/24 | (2006.01) |
| A47K 1/00 | (2006.01) |
| A47K 5/00 | (2006.01) |
| B44D 3/12 | (2006.01) |
| B67B 5/06 | (2006.01) |
| E04G 3/00 | (2006.01) |
| E04G 5/06 | (2006.01) |
| F16L 3/08 | (2006.01) |
| F21V 21/00 | (2006.01) |
| F21V 35/00 | (2006.01) |
| G01D 11/30 | (2006.01) |

(52) U.S. Cl.
CPC .............. *F24H 9/2021* (2013.01); *F16B 2/245* (2013.01); *F24H 9/20* (2013.01); *F24H 9/2007* (2013.01); *G01D 11/305* (2013.01)

(58) Field of Classification Search
CPC ..... F24H 9/2007; F24H 9/20014; F24H 9/20; F24H 9/2021; F16M 11/04; Y10T 29/49826; Y10T 29/49901; Y10T 16/373; Y10T 24/44923; Y10S 248/906; G01D 11/30; G01D 11/305; F16B 2/245
USPC ........ 248/27.3, 222.11, 222.12, 213.2, 213.3, 248/247, 248, 300; 392/455, 498, 497; 337/34, 112, 186, 372, 380, 398; 122/510, 511; 165/134.1; 110/325
See application file for complete search history.

(56) References Cited

U.S. PATENT DOCUMENTS

| | | |
|---|---|---|
| 3,276,599 A | 10/1966 | Them |
| 3,870,858 A | 3/1975 | Schimke |

(Continued)

*Primary Examiner* — Brian Mattei
*Assistant Examiner* — Taylor Morris
(74) *Attorney, Agent, or Firm* — Guy J. Houle; Houle Patent Agency Inc.

(57) ABSTRACT

A pressure clamp adapter for mounting a thermistor on an existing thermostat control support bracket secured to a hot water tank spud is described. It comprises a thermistor bracket having a rear wall with opposed transverse projecting connecting arm formations extending from an outer surface of the rear wall. A cavity is formed from the rear surface of the rear wall to form a housing shaped to receive a thermistor therein. A passage communicates with the cavity. Each of the connecting arm formations is adapted for removable attachment to a pair of upwardly projecting legs of the thermostat control support bracket.

8 Claims, 3 Drawing Sheets

(56) References Cited

U.S. PATENT DOCUMENTS

| | | | |
|---|---|---|---|
| 3,992,608 A | | 11/1976 | Snavely |
| 4,399,971 A | | 8/1983 | Fehrmann et al. |
| 4,657,215 A | | 4/1987 | Murphy |
| 4,858,067 A | * | 8/1989 | Rochelle et al. ............... 361/600 |
| 5,996,949 A | * | 12/1999 | McCraney .................... 248/158 |
| 6,302,361 B1 | * | 10/2001 | Schaefer et al. ............. 248/27.3 |
| 7,162,150 B1 | * | 1/2007 | Welch et al. .................. 392/455 |
| 2005/0072888 A1 | * | 4/2005 | Smith .................. F16J 15/3456 248/310 |
| 2007/0246556 A1 | | 10/2007 | Patterson et al. |
| 2010/0019480 A1 | * | 1/2010 | Domin et al. ................. 280/780 |
| 2011/0006646 A1 | * | 1/2011 | Kallurwar et al. ......... 312/210.5 |
| 2011/0265393 A1 | * | 11/2011 | Mass et al. ........................ 52/39 |

* cited by examiner

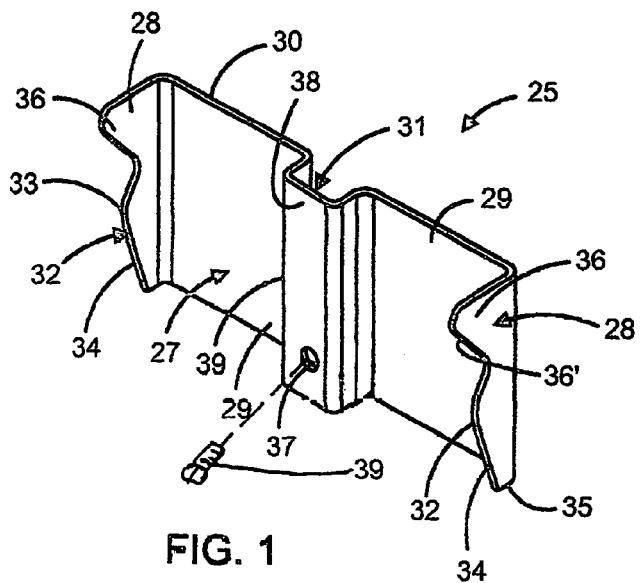 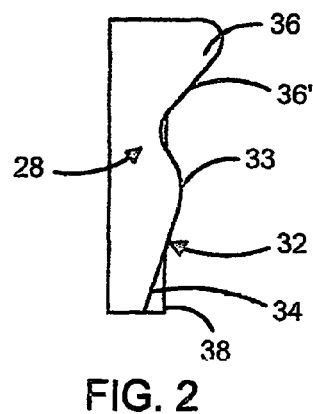
FIG. 1         FIG. 2
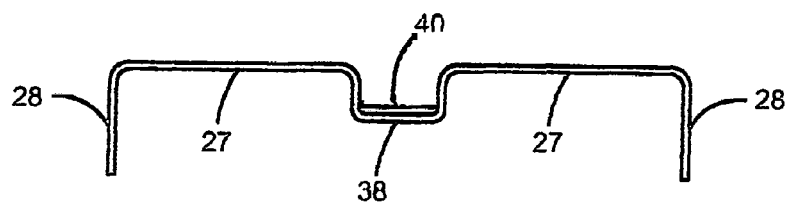
FIG. 3
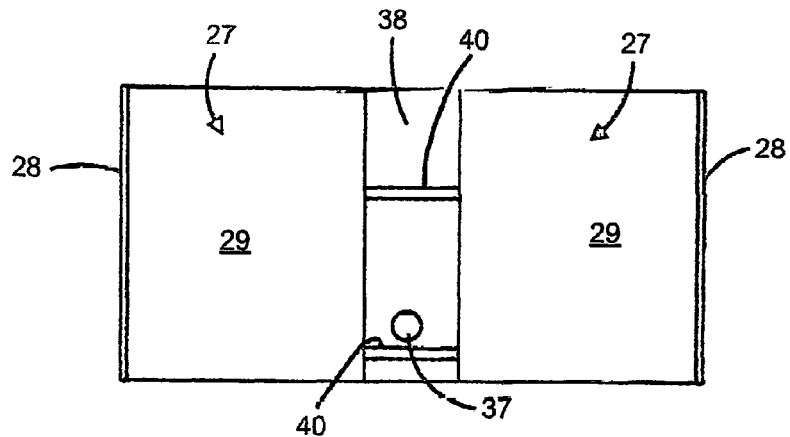
FIG. 4

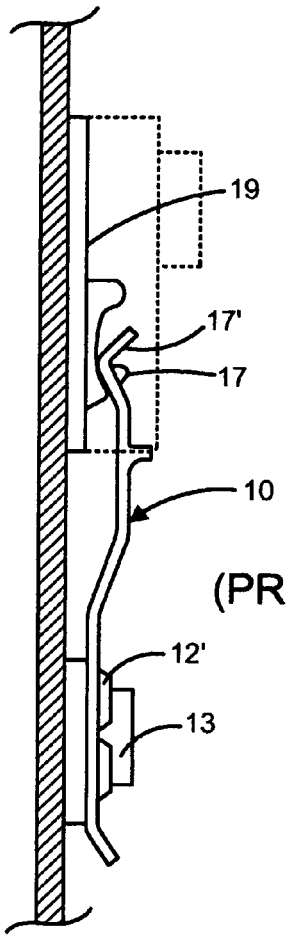
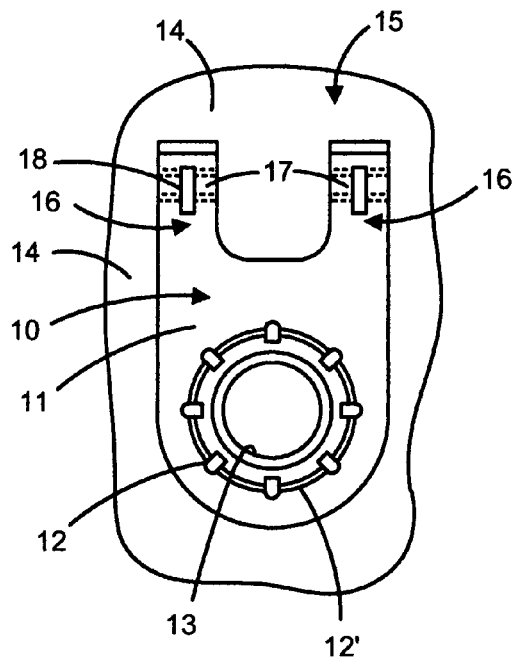
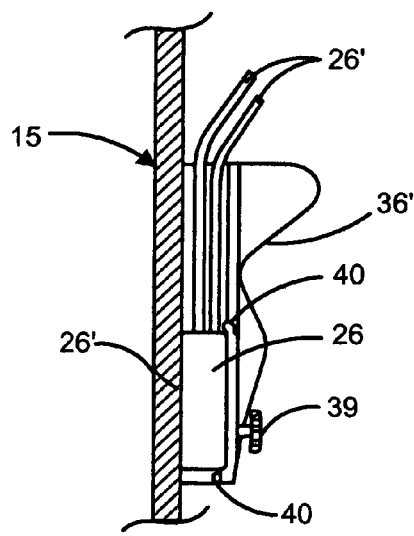
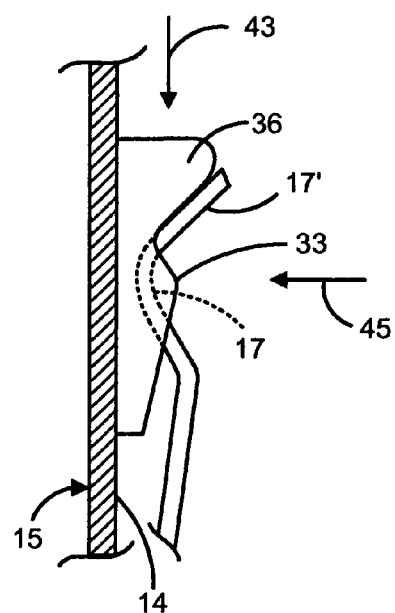
FIG. 6 (PRIOR ART)
FIG. 5 (PRIOR ART)
FIG. 7
FIG. 8

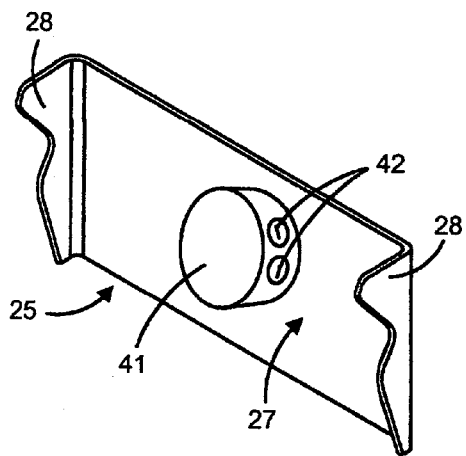
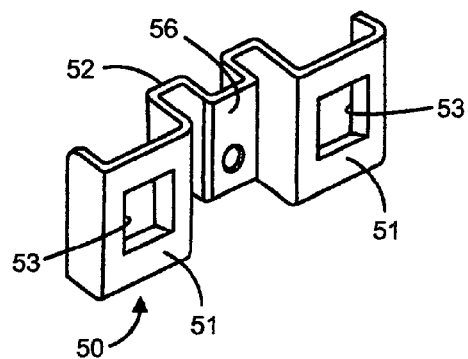
FIG. 9          FIG. 10
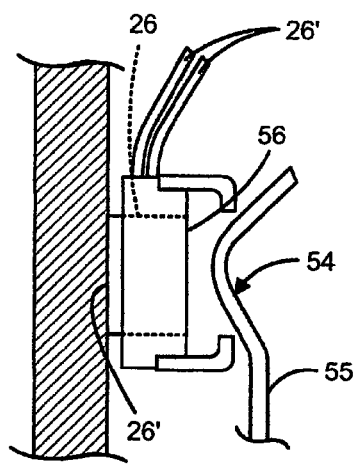
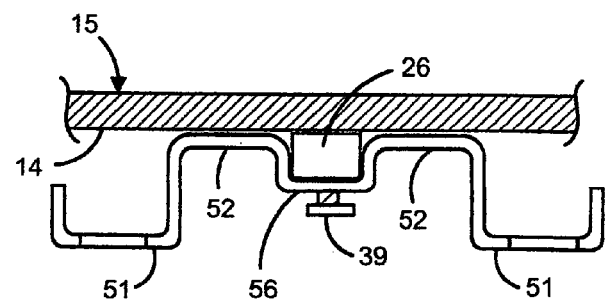
FIG. 12          FIG. 11

PRESSURE CLAMP ADAPTER FOR MOUNTING A THERMISTOR ON A THERMOSTAT CONTROL BRACKET

BACKGROUND OF THE INVENTION

The present invention relates to a pressure clamp adapter for mounting a thermistor on an existing thermostat control support bracket.

Thermostat control devices for electric water heaters have been mounted for many years on support brackets which are attached to the spuds secured to the tank of the water heater. An example of such a support bracket is described in U.S. Pat. No. 4,399,971. These spuds provide for the removable connection of the resistive heating elements. The support bracket is formed from spring steel material and has a spud connecting aperture and a pair of upstanding spring arms each having a bight formation at an outer end for clamping a support of the thermostat control device against the water tank. The thermostat control device is mounted on the support and in close proximity to the tank outer wall whereby to sense the temperature in that region. A mechanical potentiometer is provided on the control thermostat device to manually set the operating parameters of the resistive element to control the temperature of the water inside the tank in the area of the thermostat. Because such thermostat control devices are not in direct contact with the wall of the water tank there exists a gap between the temperature sensor of the thermostat control device and the actual temperature of the water inside the tank in the vicinity of the thermostat.

With the advent of automatic controls, a single electronic controller device is now utilized to control the operation of the resistive heating elements, being two or more of the resistive elements mounted at different levels in the water tank. Temperature sensor are required to be attached to the tank outer wall to sense the temperature of the tank wall at precise locations.

Because there are hundreds of thousands of electric water heaters on the market with existing thermostat control devices and their support brackets, when it is required to convert these to automatic controllers, there becomes a need to attach thermistors to the tank outer wall to feed temperature signals to the controller. Thermistors are resistors of small dimensions whose resistance varies with temperature. They also carry two leads to provide resistance readings to control circuitry of the controller. These thermistors may have sizes in the range of one eight to one quarter on an inch by a length of about half inch and have different shapes. There is therefore a need to inexpensively replace the thermostat control device and their support and secure thermistors to the tank outer wall and rewire to connect the thermistors to the controller secured outside the water heater for ease of access thereto.

SUMMARY OF THE INVENTION

According to a feature of the present invention there is provided a retrofit solution for the mounting of thermistors on water tanks of electric water heaters having mechanical thermostat control devices mounted thereon.

According to a further feature of the present invention there is provided a pressure clamp adapter for mounting a thermistor on an existing thermostat control support bracket.

According to a still further feature of the present invention there is provide a pressure clamp adapter to mount thermistors of different sizes and shapes onto an existing thermostat control support bracket and wherein the thermistor is forcibly retained against the outer wall of the water tank.

According to a still further feature of the present invention there is provided a pressure clamp adapter capable of being mounted to different shapes of upwardly projecting legs of known thermostat control device support brackets.

According to the above features, from a broad aspect, there is provided a pressure clamp adapter with an existing thermostat control support bracket secured to a tank spud of an electric hot water tank for mounting a thermistor in direct contact with the outer surface of the water tank. The pressure clamp adapter is comprised of a thermistor mounting bracket which has a rear wall with opposed substantially transversally projecting parallel connecting arm formations extending from an outer surface of the rear wall. A cavity is formed from the rear surface of the rear wall to form a housing projecting into an outer surface of the rear wall. The cavity is shaped to receive a thermistor therein. The cavity has a depth which permits a temperature sensing surface of the thermistor to project beyond the rear surface of the rear wall to contact the outer surface of the water tank. A passage communicates with the cavity. The connecting arm formations have attachment means for removable securement of the pressure clamp adapter to a pair of upwardly projecting legs of the thermostat control support bracket.

DESCRIPTION OF THE DRAWINGS

A preferred embodiment of the present invention will now be described with reference to the examples illustrated in the accompanying drawings in which:

FIG. 1 is a perspective view of an example of the pressure clamp adapter of the present invention;

FIG. 2 is a side view of the pressure clamp adapter of FIG. 1;

FIG. 3 is a top view of FIG. 2;

FIG. 4 is a front view of FIG. 2;

FIG. 5 is a front view of a prior art thermostat control support bracket showing a fragmented portion of an outer wall of a hot water tank of an electric water heater;

FIG. 6 is a side view of the prior art thermostat control support bracket to which is connected a support for a thermostat control device;

FIG. 7 is a partly fragmented side view of the pressure clamp adapter of the present invention illustrating a thermistor supported therein and positioned against an outer wall of a hot water tank;

FIG. 8 is a side view showing the removable connection of the pressure clamp adapter of FIG. 1 with the bight end portion of the legs of the thermostat control support bracket;

FIG. 9 is a perspective view illustrating a modification of the thermistor housing formed in the rear wall of the pressure applying clamp adapter;

FIG. 10 is a perspective view of a further example of the pressure clamp adapter of the present invention;

FIG. 11 is a top view of FIG. 10; and

FIG. 12 is a fragmented side view showing the removable connection of the pressure clamp adapter of FIG. 10 with the bight end portion of the legs of the thermostat control support bracket.

DESCRIPTION OF THE PREFERRED EMBODIMENT

Referring now to the drawings and more particularly to FIGS. 5 and 6, there is shown an existing prior art thermostat control support bracket 10 having a main body 11 which is provided in a lower region thereof with a circular opening 12 having bent leaves 12' thereabout to force fit the support bracket 10 about a tank spud 13 projecting from an outer wall 14 of a hot water tank 15 of an electric water heater at different levels, as is well known in the art. A resistive heating element (not shown) is usually secured to the spud 13 and projects in the interior of the tank to heat water therein.

The thermostat control support bracket 10 is formed from spring steel material, such as stainless steel, and has a pair of upwardly extending spaced-apart legs 16 with each leg having a bight formation 17 at an upper end thereof. A connecting slot 18 is provide in the bight formation 17 for connection to thermostat support bracket 19 which is mounted against the outer surface of the tank wall 14. A thermostat control device is fitted on the support bracket 19 and has a temperature sensor in a rear wall thereof spaced closely to the outer wall of the tank. The bight formation 17 of the thermostat control support bracket applies a biasing force against the support bracket 19 to retain it against the wall of the tank. The bight formation 17 does not apply pressure against the thermostat device which is spaced outwardly of the tank wall by the rear wall of the support bracket 19. Accordingly, the thermostat device does not read the exact temperature of the tank wall due to this spacing there behind. In order to establish a conductive path between the sensor of the thermostat control device and the tank wall, a conductive paste may be applied between the tank wall and the sensor surface. However, this does not provide a true reading of the exact temperature of the tank wall due to the resistance of the paste. It is also messy, and makes it difficult to remove the control device once the paste as set and hardened. It is not an ideal solution.

With additional reference now to FIGS. 1 to 4, 7 and 8, there is shown generally at 25 the pressure clamp adapter 25 of the present invention for mounting a thermistor 26 (see FIG. 7) against the tank wall by removably attaching the pressure clamp adapter on the thermostat control support bracket 10. As clearly illustrated in FIGS. 1 to 4, the pressure clamp adapter 25 is die-cut and formed from sheet metal and defines a rectangular rear wall 27 having opposed substantially transverse projecting parallel connecting means in the form of identical connecting flanges 28. The connecting flanges 28 extend from the outer surface 29 of the rear wall 27. A cavity is formed from the rear surface 30 of the rear wall to define a housing shaped to receive a thermistor therein. As herein shown the cavity is shaped as a through vertical channel 31 of rectangular cross-section extending from the top to the bottom edge of the rear wall 27. It has a depth configured to receive in close fit therein the rectangular thermistor 26 as illustrated in FIG. 7. The open ends of the through channel 31 constitutes a passage for the conductor wires 26' of the thermistor.

The connecting flanges 28 have a specific shaped outer edge 32 to define an attachment means for removable securement to the connecting slots 18 of the pair of upwardly projecting legs 16 of the thermostat control support bracket 10. The shaped outer edge 32 defines a slot engaging ridge 33 merging into an inwardly inclined lower slide edge 34 terminating at a lower end 35 of the pressure clamp adapter. It also defines an abutment ear formation 36 projecting in a top portion of the connecting flanges 28. The abutment ear projecting formation 36 defines an upwardly slopped abutment surface 36' extending from a top region of the slot engaging ridge 33 and disposed for resting contact on an outwardly bent upper end portion 17' of a respective one of the pair of upwardly projecting legs 16 of the thermostat control support bracket 10, as shown in FIG. 8.

As shown in FIGS. 1 and 4, a hole 37 is formed in an outer wall 38 of the through channel 31 to receive a set screw 39 threaded therein to arrest the thermistor 26 in position and secured in the cavity/housing once mounted against the tank wall. The thermistor 26 is also immobilized by its close fit between the opposed side walls 39 of the through slot 31. Arresting ribs 40 may also be formed to project in the rear surface of the outer wall 38 to form arresting positioning means for the thermistor.

As shown in FIG. 9, and because thermistors may have different shapes, the cavity/housing 31 may be constituted by a circular cavity punched in the rear surface 30 of the rear wall 27 to form a circular housing 41 to receive a circular thermistor of circular shape (not shown) therein. One or two holes 42 provides for the passage of the thermistor leads 26'.

Referring to FIG. 8 there is shown the connection of the pressure clamp adapter 25 to the upwardly projecting legs 16. As herein shown, the slot engaging ridge 33 of each connecting flange 28 is disposed in a respective one of the slots 18 of the projecting legs 16. The pressure clamp adapter with its thermistor 26 is slid downwardly in the direction of arrow 43 between the tank outer surface 14 and the legs 16 with the legs 16 having been pulled back due to their flexibility to facilitate the insertion. The angulated slide edge 34 also facilitates the insertion behind the legs. The ears 36 provide a stop onto the outwardly bent upper end portions 17' of the legs 16. The slot engaging ridge 33 of the connecting flanges is spaced forwardly of the rear wall 27 of the clamp adaptor a distance sufficient to cause an outward force against the outwardly bent upper portion 17 of the pair of upwardly projecting legs 16 of the thermostat support bracket when disposed between the outwardly bent upper portion and the outer tank wall 14 whereby to cause the upwardly projecting legs to apply a biasing force, in the direction of arrow 45, against the pressure clamp adapter to force the temperature sensing surface 26' (see FIG. 7) of the thermistor 26 against the outer wall 14 of the tank 15 (see FIG. 5).

Referring now to FIGS. 10 to 12 there is illustrated a further example of the construction of the pressure clamp adapter, herein a modified version 50. As herein shown, the connecting means is comprised by a forwardly extending wall formation 51 formed in opposed rear wall portions of the flat rectangular rear wall 52, The forwardly extending wall formations 51 each have an aperture 53, herein a rectangular hole, sized to receive a bight portion 54 of one of a pair of upwardly projecting legs 55 of a thermistor control support bracket similar to that illustrated in FIGS. 5 and 6 but wherein there are no slots 18 in the legs 55.

As shown in FIGS. 10 to 12, the forwardly extending wall formations 51 extend forwardly of the thermistor housing 56 formed in the rear wall 52 a distance sufficient to cause an outward force against the outwardly bent upper portion of the projecting legs 55 of the thermostat control bracket when disposed between the outwardly bent upper portion, the bight portion 54, and the outer wall 14 of the hot water tank wherein the upwardly projecting legs apply a biasing force against the pressure clamp adapter to force the temperature sensing surface 26' of the thermistor 26 against the outer wall 14 of the hot water tank.

It is within the ambit of the present invention to cover any modifications of the preferred embodiment described herein provided such modifications fall within the scope of the appended claims.

The invention claimed is:

1. A pressure clamp adapter in combination with an existing thermostat control support bracket and a thermistor, said thermostat control support bracket being secured to a tank spud of an electric hot water tank; said pressure clamp adapter, when in clamping retention by said thermostat control support bracket, mounting said thermistor in direct contact with an outer surface of a water tank wall; said pressure clamp adapter comprising a thermistor mounting bracket having a rear wall with opposed substantially transversally projecting parallel connecting arm formations extending from an outer surface of said rear wall, a through vertical channel of rectangular cross-section extending from a top to a bottom edge of said rear wall, said through vertical channel having a depth and a width to receive said thermistor in close fit therein, said thermistor having a temperature sensing surface projecting beyond a rear surface of said rear wall to contact said outer surface of said water tank wall, said through vertical channel defining open ends for access to conductor wires of said thermistor, said connecting arm formations having attachment means for removable securement of said pressure clamp adapter to a pair of upwardly projecting legs of said thermostat control support bracket.

2. The pressure clamp adapter in combination with an existing thermostat control support bracket and a thermistor as claimed in claim 1 wherein each said connecting arm formations is comprised by a transverse flange formed in opposed end edges of said rear wall, each said transverse flanges having a shaped outer edge defining a slot engaging ridge merging into an inwardly inclined lower slide edge terminating at a lower end of said pressure clamp adapter.

3. The pressure clamp adapter in combination with an existing thermostat control support bracket and a thermistor as claimed in claim 1 wherein said through vertical channel has a thermistor arresting means associated therewith to immovably secure said thermistor therein.

4. The pressure clamp adapter in combination with an existing thermostat control support bracket and a thermistor as claimed in claim 3 wherein said thermistor arresting means is a set screw threadably secured to an outer wall of said housing.

5. The pressure clamp adapter in combination with an existing thermostat control support bracket and a thermistor as claimed in claim 3 wherein said thermistor arresting means is provided by arresting ribs formed in a rear outer surface of said through vertical channel flanges.

6. The pressure clamp adapter in combination with an existing thermostat control support bracket and a thermistor as claimed in claim 1 wherein each said parallel connecting arm formations shaped outer edge further defines an abutment ear projecting formation in a top portion of said parallel connecting arm formations, said abutment ear projecting formation defining an upwardly sloped abutment surface extending from an upper base region of said slot engaging ridge and disposed for abutment contact with an outwardly bent upper portion of a respective one of a pair of upwardly projecting legs of said thermostat control support bracket.

7. The pressure clamp adapter in combination with an existing thermostat control support bracket and a thermistor as claimed in claim 6 wherein said thermostat control support bracket is formed from spring steel material, said upwardly projecting legs of said outwardly bent upper portion are each provided with a connecting slot, said slot engaging ridge of said parallel connecting arm formations being disposed to project into a respective one of said connecting slot of said outwardly bent upper portion of said pair of upwardly projecting legs of said thermostat control bracket when said pressure clamp adapter is in said clamping retention by said thermostat control support bracket, said attachment means being constituted by said slot engaging ridge.

8. The pressure clamp adapter in combination with an existing thermostat control support bracket and a thermistor as claimed in claim 7 wherein said slot engaging ridge of said parallel connecting arm formations is spaced forwardly of said rear wall of said pressure clamp adapter a distance sufficient to cause an outward force against said outwardly bent upper portion of said pair of upwardly projecting legs of said thermostat control bracket when disposed between said outwardly bent upper portion and said outer surface of said water tank wall whereby to cause said upwardly projecting legs to apply a biasing force against said clamp adapter to force said temperature sensing surface of said thermistor against said outer surface of said water tank wall.

\* \* \* \* \*